United States Patent
Di Stefano

[19]

[11] Patent Number: 6,070,481
[45] Date of Patent: Jun. 6, 2000

[54] PISTON ACTUATED WHEEL CLUTCH

[76] Inventor: Alfonso Di Stefano, 1413 Wayburn Rd., Grosse Pointe Park, Mich. 48230

[21] Appl. No.: 09/368,821

[22] Filed: Aug. 5, 1999

Related U.S. Application Data

[62] Division of application No. 09/041,162, Mar. 12, 1998.
[51] Int. Cl.[7] ............................. F16H 3/08; F16D 11/04; F16D 11/10; F16D 13/22
[52] U.S. Cl. ........................ 74/333; 192/69.41; 192/69.4
[58] Field of Search ............................. 192/69.4, 69.41, 192/85 AB, 70, 49, 18 A; 74/333, 334

[56] References Cited

U.S. PATENT DOCUMENTS

| | | | |
|---|---|---|---|
| 5,419,419 | 5/1995 | Macpherson | 74/333 |
| 5,507,195 | 4/1996 | Trick | 74/333 |

*Primary Examiner*—Charles A Marmor
*Assistant Examiner*—Tisha D. Waddell
*Attorney, Agent, or Firm*—Christopher P. Maiorana, P.C.

[57] ABSTRACT

A piston actuated wheel clutch includes the use of a clutch plate 26 to directly engage a driven member 14, where the driven member 14 may comprise the rim 94 of a wheel. The clutch plate 26 is divided into clutch portions 40 to 46 which expand outward when pushed by hydraulicly actuated pistons mounted within a drive shaft 20. When expanded, the clutch plate 26 engages the driven member 14.

12 Claims, 2 Drawing Sheets

6,070,481

PISTON ACTUATED WHEEL CLUTCH

CROSS REFERENCE TO RELATED APPLICATIONS

This application is a divisional/continuation-in-part of Ser. No. 09/041,162, filed Mar. 12, 1998, which is hereby incorporated by reference in its entirety.

FIELD OF THE INVENTION

The present invention relates to a wheel clutch mechanism generally and, more particularly, to a piston actuated wheel clutch mechanism.

BACKGROUND OF THE INVENTION

It is known in the art to couple a clutch to a flywheel of an engine in order to provide the engagement and disengagement means to drive the wheels of a vehicle. The location of such a clutch is not always practical and is often difficult to access for maintenance purposes. Often, if the clutch requires replacement, the complete powertrain must be lowered in order to gain access.

In addition, such vehicles often require brake mechanisms located at the wheel. Such mechanisms include the use of a non-rotating brake pad and a rotating rotor or drum. The rotor of the brake mechanism and the driven portion of the clutch both rotate with movement of the vehicle wheel. These driven portions may amount to a redundancy in parts and an unnecessary expense in manufacturing.

It would be desirable to simplify the maintenance procedure of the clutch mechanism. It would further be desirable to design a singular driven portion capable of performing the multiple function of braking and engaging a clutch, thereby reducing manufacturing costs and weight of the vehicle.

SUMMARY OF THE INVENTION

The present invention provides a piston actuated clutch wheel that may be implemented in a vehicle or other powered machine requiring rotational movement. A drive member having a shaft and a clutch plate is generally coupled to a driven member having a hub and a rim. The rim may be utilized to mount a tire or provide the surface to turn a machine belt.

The driven member may further comprise an interior surface and an exterior surface. The clutch plate may expand upon contact of pistons which actuate upon receipt of hydraulic pressure. The plate portions expand and may engage upon the interior surface of the driven member thereby rotating the rim. Upon loss of pressure, plate mounted springs may force the clutch plate to retract and disengage the driven member.

As an additional feature, the exterior surface of the driven member, when combined with a brake mechanism, may inhibit rotation of the driven member when desired. The exterior surface may act as a rotor, or drum, when a brake pad of the brake mechanism engages.

Objects features and advantages of the present invention include providing a piston actuated wheel clutch that may (i) have a reduced number of parts, and/or (ii) provide a simplified means of maintaining the clutch. In general, the present invention provides a dual function to what was once two independent functions. The brake rotor has been replaced with the driven member of the clutch and the clutch has been moved from the engine flywheel to the wheel of a vehicle.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figures 1A, 1B:
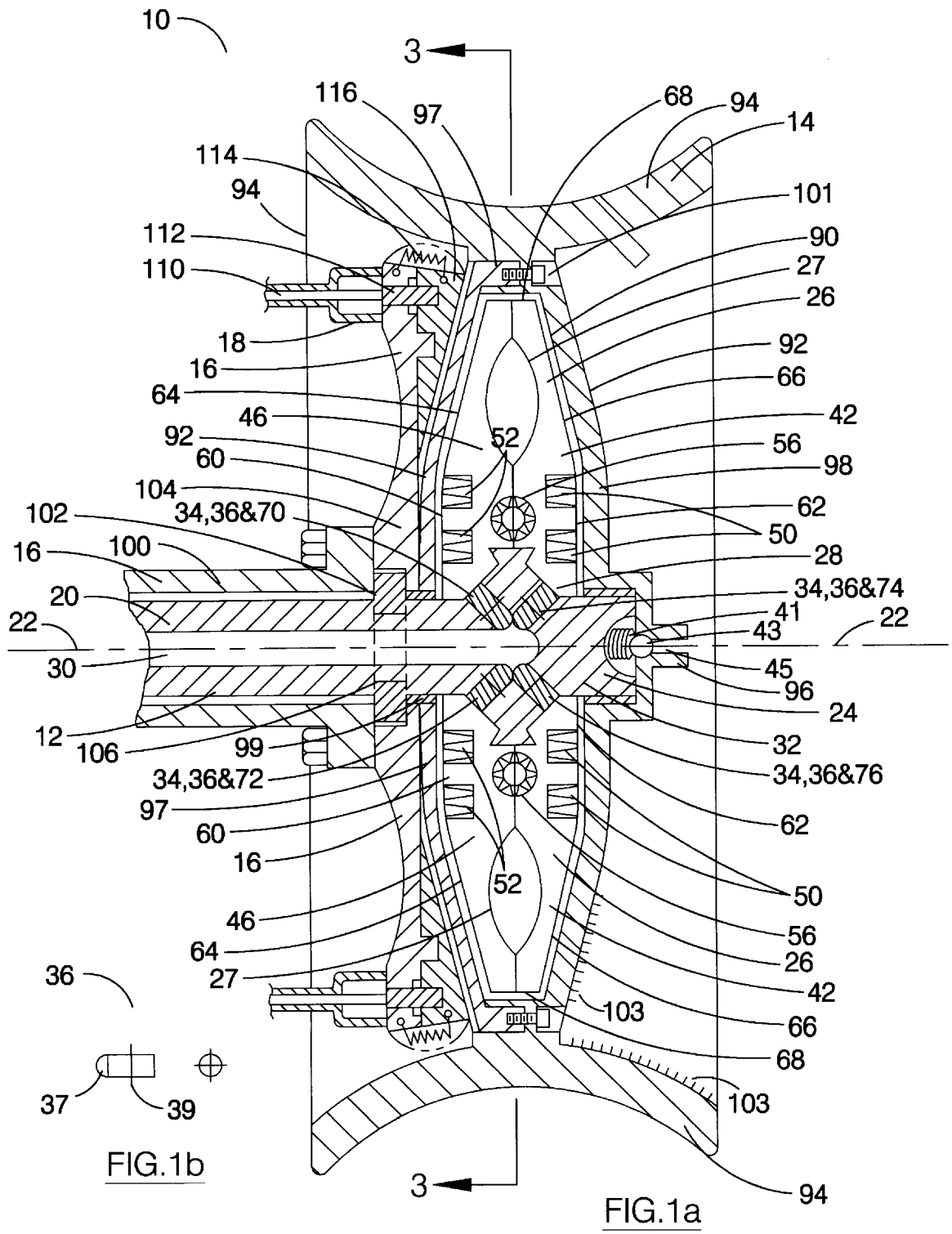
FIGS. 1A and 1B are diagrams of a preferred embodiment of the present invention.

Referring to FIG. 1A, a piston actuated wheel clutch mechanism 10 is shown in accordance with a preferred embodiment of the present invention. The wheel clutch mechanism generally comprises a drive member 12, a driven member 14, a stationary member 16 and at least one braking mechanism 18. The driven member 14 may include the wheel of a vehicle. However, one skilled in the art could also design the driven member 14 as an integral part of any torsional or rotational engagement device, such as that for a belt driven machine. The drive member 12 generally spins and has the ability to engage the driven member 14 thereby transferring torque upon demand.

The drive member 12 generally comprises a shaft 20 and a clutch plate 26. The shaft 20 may have an axis 22 about which the drive member 12 rotates, a protrusion 28 about which the clutch plate 26 is rotatably engaged, and an end 24 wherein the driven member 14 mounts, and spins about, when the clutch plate 26 is not engaged. The clutch plate 26 generally conforms to a disk shape having a first and second opposite inner annular surface 60 and 62, a first and second opposite outer tapered surface 64 and 66, and a radial surface 68. The clutch plate may have hollow openings 27 to reduce weight. The surfaces 60 and 62 are parallel to one another and generally perpendicular to the axis 22. In addition, the surfaces 60 to 68 are generally concentrically located about axis 22. The surfaces 64 and 66 taper toward one another in a radially outward direction from the axis 22. The shaft 20 further comprises a fluid channel 30 generally located concentrically about the axis 22. The fluid channel 30 feeds a hydraulic chamber 32 of the drive member 12. The chamber 32 has a plurality of piston ports 34 which may each house a corresponding plurality of pistons 36. The plurality of pistons 36 may, upon receipt of hydraulic or air pressure, press upon the clutch plate 26, causing the surfaces 60 to 68 to engage the driven member 14. The wheel clutch mechanism 10 may also comprise a spring 41, a ball bearing 43 and a grease fitting 45.

Referring to FIG. 1B, a detailed drawing of an exemplary portion of one of the plurality of pistons 36 is shown. The drawing demonstrates a top view and a side view of the piston 36. The piston 36 is shown having a generally cylindrical shape and a round bottom 37. The piston 36 may also comprise a ring 39. However, other shapes may be implemented accordingly to meet the design criteria of a particular implementation.

The driven member 14 may comprise a first half 97, having a central hole 99, and a second half 98, having a hub 96 and a rim 94. The halves 97 and 98 are generally connected by a plurality of bolts 101. The halves 97 and 98 further share an internal surface 90 and an external surface 92. The halves 97 and 98 may have a plurality of fins 103 that may disperse excess heat. The internal surface 90 generally encapsulates and conforms to the shape of the clutch plate 26. The internal surface 90 generally maintains enough clearance to permit free-wheeling when the plate 26 is not engaged.

The external surface 92 may be of a conical shape about which the rim 94 may be mounted. In one example, the rim 94 may be mounted to the second half 98, where the two halves are then secured together. The hub 96 may be radially centered on the exterior surface 92 of the second half 98. The hub 96 and the central hole 99 are rotatably mounted to the shaft 20 which generally assures that the driven member 14 remains concentric about the axis 22.

Figure 2:
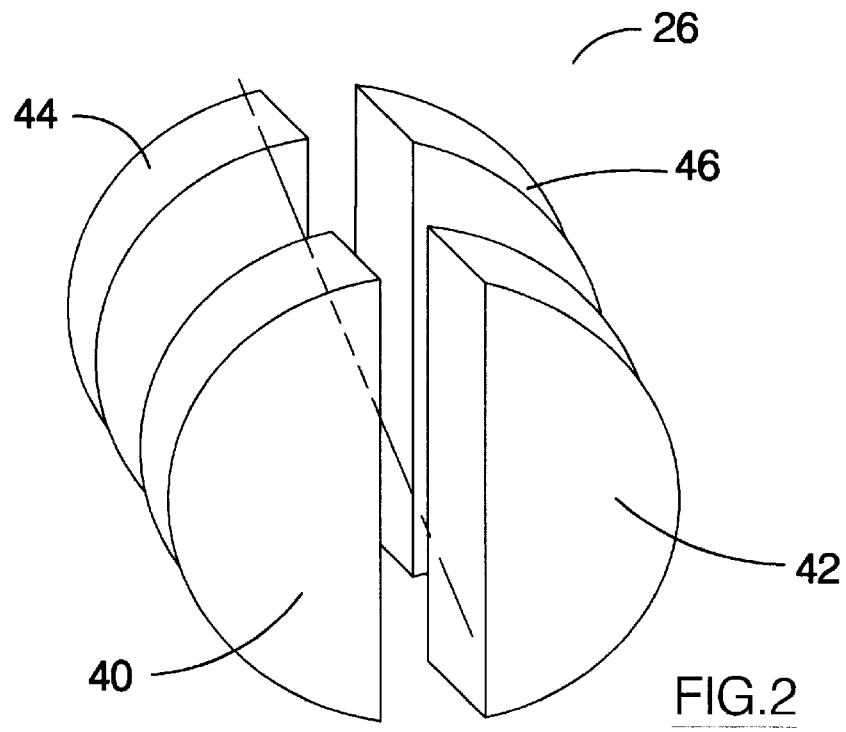
FIG. 2 is an exploded view a clutch plate.

As shown in FIG. 2, the clutch plate 26 is generally divided into generally equal portions 40, 42, 44, and 46. As further shown in FIGS. 1A and 3, the four portions of the clutch plate 26 are held together by a series of springs. At least one first spring 50 will bias the first portion 40 and the second portion 42 together. At least one second spring 52 will bias the third portion 44 to the fourth portion 46 together. A plurality of third springs 54 will bias the third portion 44 and the first portion 40 together. A plurality of fourth springs 56 will bias the fourth portion 46 and the second portion 42 together. For simplicity, the springs have not been shown in FIG. 2.

Figure 3:
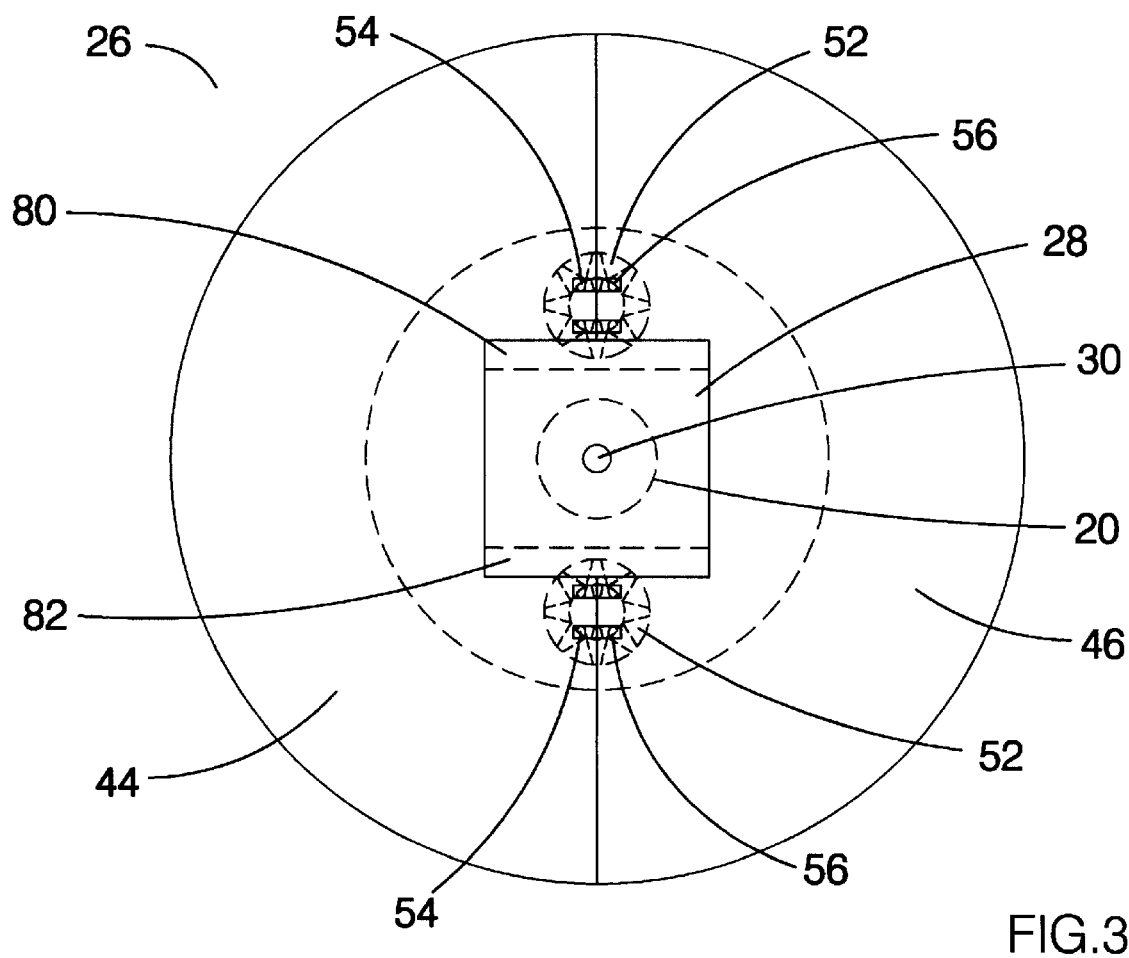
FIG. 3 is a cross sectional view of the preferred embodiment.

Referring to FIG. 3, a cross section of the plate 26 is shown. The protrusion 28 has a square shape which is generally centered about axis 22 and rigidly attached to shaft 20. This noncircular shape may assure that the clutch plate 26, mounted on the protrusion 28, is always engaged to the shaft 20. The protrusion 28 may further have two opposing and parallel sides which form keys 80 and 82. The keys 80 and 82 generally assure that the portions 40 to 46, shown in FIG. 2, remain symmetric about the protrusion 28 as the clutch plate 26 engages and disengages the driven member 14. Although FIG. 3 shows an example having a square protrusion 28, the protrusion 28 may be of any nonecylindrical shape having two parallel sides in order to form the keys 80 and 82.

Referring back to FIG. 1A, the plurality of piston ports 34 comprise ports 70, 72, 74, and 76. Each port houses one piston of the plurality of pistons 36. The plurality of pistons 36 may be able to oscillate back and forth within the plurality of piston ports 34 by use of a typical master cylinder or other forward and reverse flow device (not shown). The plurality of pistons 36 generally oscillate in unison. The plurality of pistons 36 generally move in opposing directions, forming a generally planar star burst effect. The ports 70 and 72 may serve to engage the portions 44 and 46 upon the driven member 14. The ports 74 and 76 may engage the portions 40 and 42 upon the driven member 14. It is apparent to one skilled in the art that any number of piston ports arranged in a wide variety of geometries can serve to expand the clutch plate 26 against the driven member 14. An advantage of the example illustrated in FIG. 2 is that the plate 26 may be broken into four sections, not just two as one may see in a drum brake application. Six points of engagement between the clutch plate 26 and the driven member 14 may result. Increasing the number of plate portions will increase the points of engagement.

The stationary member 16 generally comprises an encasement 100, a retaining ring 102, and a radial extension 104. The encasement 100 may encase and protect the rotating shaft 20. The retaining ring 102 may be axially mounted between the encasement 100 and the radial extension 104. The retaining ring 102 generally restricts any axial movement of the shaft 20 by riding within a radial groove 106 located on shaft 20.

At least one braking mechanism 18 may be mounted to radial extension 104. Each one of the braking mechanisms 18 may include a hydraulic supply 110, a brake piston 112, a return spring 114, and a brake pad 116. Similar to the clutch plate embodiment of the present design, the hydraulic supply 110 generally requires a master cylinder capable of producing reverse flow of fluid. An air release may be required should an air pressure system be utilized (not shown). Upon receipt of pressure, the piston 112 pushes against the brake pad 116. The piston 112 may engage the external surface 92 of the driven member 14, thereby restraining the rotation of the driven member 14. The spring 114 is generally connected between the brake pad 116 and the radial extension 104. When the hydraulic (or air) pressure is released, the spring 114 may disengage the brake pad 116 from the external surface 92 of the driven member 14.

Referring back to FIG. 1, at least one first and second springs 52 and 50 are secured to inner annular surfaces 60 and 62, respectively. As such, fabrication of the drive member 12 will entail first securing the plurality of third springs 54 to portions 44 and 40, then engaging the combined portions 44 and 40 over the keys 90 and 92. Second, the plurality of second springs 56 are generally used to secure portions 46 and 42. Once combined, portions 46 and 42 are also engaged upon the keys 90 and 92 from the opposing side, thereby forming the clutch plate 26. To hold the clutch plate 26 together, at least one second spring 52 is then used to secure portions 44 and 46 together. At least one first spring 50 may be used to secure portions 40 and 42 together.

While the invention has been particularly shown and described with reference to the preferred embodiments thereof, it will be understood by those skilled in the art that various changes in form and details may be made without departing from the spirit and scope of the invention.

What is claimed is:

1. A wheel clutch comprising:

a shaft;

a protrusion rigidly attached to said shaft;

a clutch plate mounted to said protrusion;

a fluid channel within said shaft;

a hydraulic chamber formed in said fluid channel, wherein said hydraulic chamber is centered within said protrusion;

a plurality of piston ports formed in said hydraulic chamber;

a plurality of pistons each connected to one of said plurality of piston ports, said pistons engaging said clutch plate upon receipt of pressure; and a driven member rotatably mounted to said shaft and said driven member encapsulating said clutch plate, wherein said clutch plate engages said driven member upon receipt of pressure from said plurality of pistons.

2. The wheel clutch according to claim 1, wherein the clutch plate comprises:

at least one first spring biasing together a first portion and a second portion;

at least one second spring biasing together a third portion and a fourth portion;

a plurality of third springs biasing together said third portion and said first portion; and a plurality of fourth springs biasing together said fourth portion and said second portion.

3. The wheel clutch according to claim 2, wherein the protrusion is centered about said shaft, said protrusion forming two opposing keys perpendicular to said shaft, said keys dividing said first and said second portions from said third and said fourth portions, and where said plurality of pistons are evenly spaced about said keys such that said portions are pushed axially and radially outward from said shaft and away from said keys until said portions engage said driven member.

4. The wheel clutch according to claim 3, wherein the clutch plate further comprises two opposite and parallel inner annular surfaces, two opposite outer tapered surfaces, and a radial surface, where said inner annular surfaces radially merge into respective said tapered surfaces, wherein said tapered surfaces taper toward, and are connected by, said radial surface and said at least one first spring and at least one second spring are mounted to said first inner annular surface and said second inner annular surface.

5. The wheel clutch according to claim 4, wherein the driven member has an internal surface which conforms to said clutch plate.

6. The wheel clutch according to claim 1, wherein the driven member comprises an external surface concentrically located about said shaft, a mounting rim rigidly connected to said external surface, and a hub concentrically and rotatably located about an end of said shaft.

7. The wheel clutch according to claim 6 wherein the mounting rim mounts a tire of a vehicle.

8. The wheel clutch according to claim 6, wherein the mounting rim forms the seat of a pulley which mounts a belt for driving a machine.

9. The wheel clutch according to claim 6 further comprising:
   a stationary member having an encasement concentrically located about said shaft, a radial extension concentrically located about said shaft and mounted axially between said encasement and said driven member, and a retaining ring mounted axially between said encasement and said radial extension, said ring extending radially beyond and free-wheeling within a groove, said groove radially located about said shaft such that said shaft is prevented from moving axially with respect to said stationary member; and
   at least one braking mechanism each having, a brake pad actuated by a user input and a return spring connected between said pad and said radial extension, such that said pad engages said external surface of said driven member upon receipt of the user input, said spring disengaging said pad from said external surface when said input is negated.

10. The wheel clutch according to claim 9 wherein the user input comprises a hydraulic supply which actuates a piston that engages said brake pad upon receipt of pressure.

11. A method of manufacturing a wheel clutch, comprising the steps of:
   preparing a drive member having a shaft, said shaft having a protrusion and an end, said protrusion rigidly connected to said shaft and axially located near said end, said protrusion including a first key and a second key, said keys being opposing and parallel to one-another and perpendicular to said shaft, said drive member further having a clutch plate, said clutch plate comprising a first portion, a second portion, a third portion, and a fourth portion, said portions being symmetrical and conforming about said keys;
   securing a plurality of third springs to said third portion and said first portion of said clutch plate;
   sliding said combined third and first portions over said keys;
   securing a plurality of fourth springs to said fourth portion and said second portion of said clutch plate;
   sliding said combined fourth and second portions over said keys from the opposite end such that said portions form said clutch plate;
   mounting at least one second spring between said third portion and said fourth portion to further hold said clutch plate together;
   mounting at least one first spring between, said first portion and said second portion to complete the formation of said clutch plate;
   preparing a driven member having an exterior surface and an interior surface, said member further having a first half and a second half, said first half having a center hole, said second half having a center hub and a rim;
   inserting said shaft through said hole of said first half, opposite said end such that said interior surface of said first half is facing said end and conforms to said third and said fourth portions;
   placing said second half of said driven member over said clutch plate such that said hub mounts to said end and said interior surface faces and conforms to said first and second portions; and
   securing said first half and said second half rigidly together.

12. A method of manufacturing a wheel clutch as claimed in claim 11 further comprising the steps of:
   preparing a stationary member having an encasement, a retaining ring, and a radial extension;
   sliding said radial extension over said shaft facing said exterior surface of said first half;
   inserting said retaining ring within a groove located radially about said shaft next to said radial extension;
   sliding said encasement about said shaft; and
   securing said encasement to said radial extension such that said retaining ring is held between, thereby preventing axial movement of said shaft with respect to said stationary member.

* * * * *